(12) United States Patent
Sakane et al.

(10) Patent No.: US 8,200,090 B2
(45) Date of Patent: Jun. 12, 2012

(54) OPTICAL TRANSMISSION APPARATUS, OPTICAL TRANSMISSION METHOD, AND OPTICAL TRANSCEIVER

(75) Inventors: Yuichiro Sakane, Fukuoka (JP); Ryuta Hoshi, Fukuoka (JP); Akira Yamamoto, Fukuoka (JP); Tsutomu Tsurumi, Kawasaki (JP); Yasushi Sugaya, Kawasaki (JP); Tomoyuki Sakata, Fukuoka (JP); Kouichi Maeda, Fukuoka (JP); Hiromu Yoshii, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 416 days.

(21) Appl. No.: 12/560,480

(22) Filed: Sep. 16, 2009

(65) Prior Publication Data

US 2010/0067917 A1 Mar. 18, 2010

(30) Foreign Application Priority Data

Sep. 18, 2008 (JP) .................................. 2008-239495

(51) Int. Cl.
*H04B 10/08* (2006.01)
(52) U.S. Cl. .......... 398/81; 398/147; 398/192; 398/195; 398/196
(58) Field of Classification Search .................... 398/81, 398/147, 192, 195–196
See application file for complete search history.

(56) References Cited

U.S. PATENT DOCUMENTS

| 6,871,024 B2 * | 3/2005 | Nishimoto et al. | 398/159 |
| 2004/0114936 A1 * | 6/2004 | Sugihara et al. | 398/147 |
| 2004/0179849 A1 * | 9/2004 | Miyazaki | 398/147 |

FOREIGN PATENT DOCUMENTS

| JP | 2002-208892 | 7/2002 |
| JP | 2003-224523 | 8/2003 |

* cited by examiner

*Primary Examiner* — Danny Leung
(74) *Attorney, Agent, or Firm* — Fujitsu Patent Center (57) ABSTRACT

An aspect of the embodiments utilizes an optical transmission apparatus which includes a rough adjustment execution portion that monitors a bit error rate of an optical signal for set values of a dispersion compensator where the set values have been set less closely to each other within a dispersion compensation control range than when a wavelength dispersion value set in the dispersion compensator is determined, and carries out a rough adjustment to determine a comparison threshold value used to set the wavelength dispersion value based on the monitored bit error rate, and a fine adjustment execution portion that monitors the bit error rate for the dispersion compensator the set values have been set more closely to each other, and carries out an adjustment to determine a wavelength dispersion value corresponding to the midpoint between the two acquired bit error rates as the wavelength dispersion value of the dispersion compensator.

7 Claims, 11 Drawing Sheets

OPTICAL TRANSMISSION APPARATUS, OPTICAL TRANSMISSION METHOD, AND OPTICAL TRANSCEIVER

CROSS-REFERENCE TO RELATED APPLICATION

This application is based upon and claims the benefit of priority of the prior Japanese Patent Application No. 2008-239495, filed on Sep. 18, 2008, the entire contents of which are incorporated herein by reference.

FIELD

The embodiments discussed herein are related to an optical transmission apparatus, optical transmission method, and an optical transceiver.

BACKGROUND

In recent years, optical network systems for realizing communication speeds of 40 Gbps have been actively introduced in order to cope with increasing communication traffic. In an optical transmission apparatus for sending and receiving optical signals within an optical network system, dispersion compensation is provided by a VDC (variable dispersion compensator) to compensate for distortion (dispersion) of waveforms produced in optical signal pulses as the communication speed is increased.

Figure 10A:
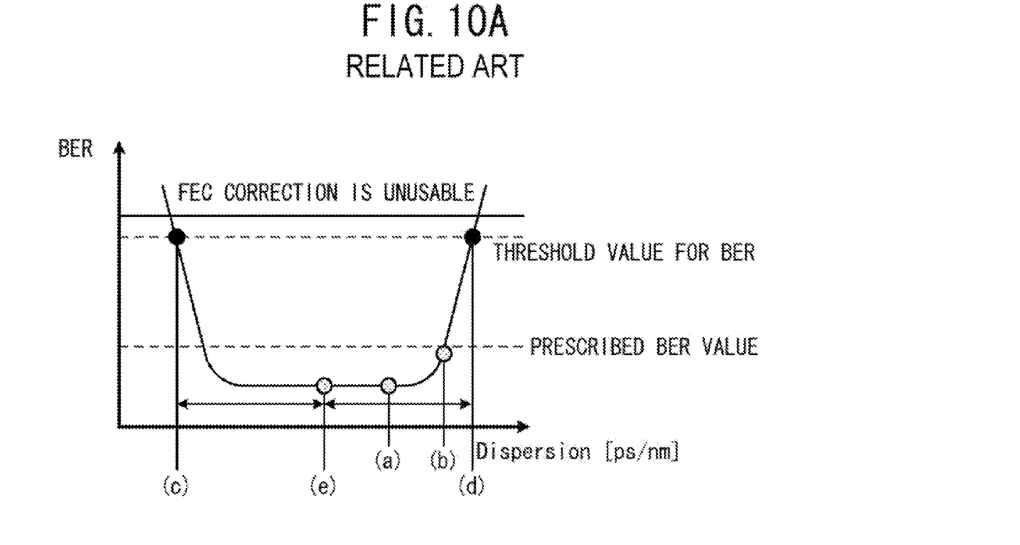
FIG. 10A is a graph illustrating the prior art.
Figure 10B:
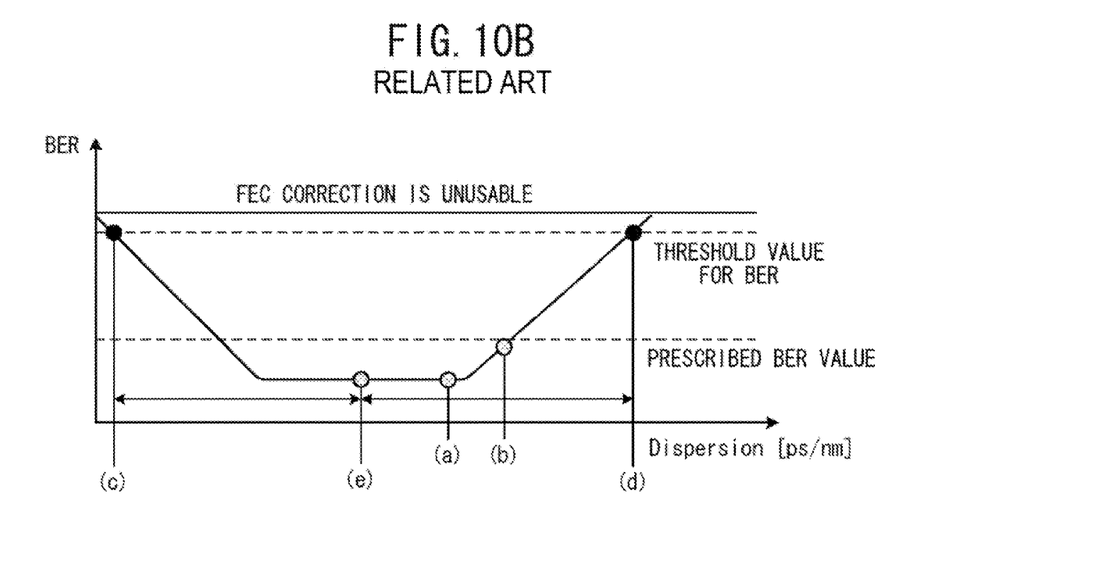
FIG. 10B is a graph illustrating the prior art.

For example, JP-A-2002-208892 or JP-A-2003-224523 discloses a technique for holding the wavelength dispersion value of a VDC either at a position where the bit error rate (BER) is lowest (for example, see (a) of FIGS. 10A and 10B) or at a given position where the bit error rate is lower than a prescribed BER value (for example, see (b) of FIGS. 10A and 10B) in a parabola indicating the dispersion characteristics for transmitted optical signals.

Furthermore, the above-cited JP-A-2002-208892 discloses a technique which, when the lowest point of the bit error rate is not found, sets an optimum wavelength dispersion value at the midpoint (for example, see (e) of FIGS. 10A and 10B) between the wavelength dispersion values of the variable dispersion compensator at two points (for example, see (c) and (d) of FIGS. 10A and 10B) at which the parabola indicating the dispersion characteristics for transmitted optical signals intersects with a level line of a preset threshold value for the BER.

Furthermore, the above-cited JP-A-2002-208892 discloses a technique of creating a threshold value for a reset operation to trigger the reset operation in order to reset an optimum wavelength dispersion value according to variation of the dispersion characteristics for an optical signal caused, for example, by outside air temperature variations.

SUMMARY

According to an aspect of the embodiment, an optical transmission apparatus includes a rough adjustment execution portion that monitors a bit error rate of an optical signal for respective set values for a dispersion compensator where the set values have been set less closely to each other within a dispersion compensation control range than when a wavelength dispersion value set in the dispersion compensator is determined, and carries out a rough adjustment to determine a comparison threshold value used to set the wavelength dispersion value of the dispersion compensator based on the monitored bit error rate; and a fine adjustment execution portion that monitors the bit error rate for the respective set values of the dispersion compensator where the set values have been set more closely to each other than the set values for the rough adjustment execution portion, using the minimum value of the bit error rates acquired by the rough adjustment execution portion as a starting point, compares the monitored bit error rate with the comparison threshold value determined by the rough adjustment execution portion, acquires two bit error rates which first exceed the comparison threshold value, and carries out a fine adjustment to determine a wavelength dispersion value corresponding to the midpoint between the two acquired bit error rates as the wavelength dispersion value of the dispersion compensator.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

The technique already described in the "Background" section above has some problems. That is, there is a danger that communication failures will be caused or it will take a long time to set the wavelength dispersion value.

Figure 11A:
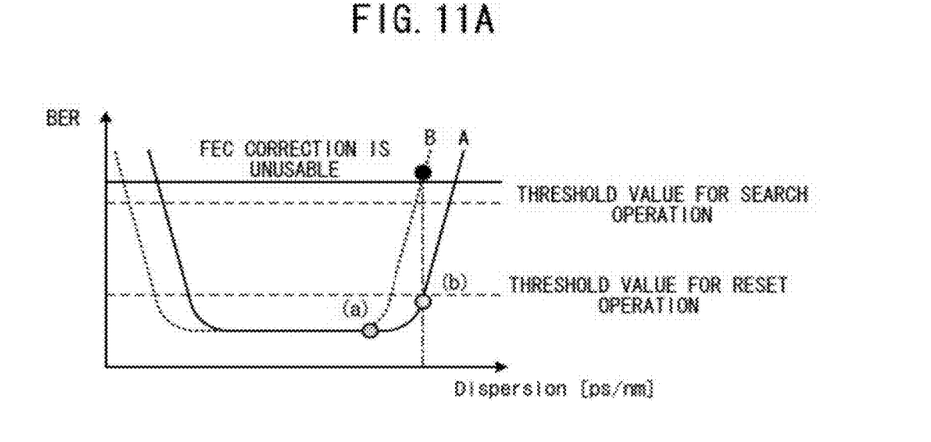
FIG. 11A is a graph illustrating a first kind of dispersion characteristics for optical signals.

In particular, where a transmitted optical signal shows a dispersion characteristic curve having a wide bottom portion as illustrated in FIG. 11A, the wavelength dispersion value of a variable dispersion compensator (VDC) may be set at a position where the bit error rate (BER) assumes its minimum value (for example, see (a) of FIG. 11A) rather than at the center of a parabola showing the dispersion characteristics. Similarly, as illustrated in FIG. 11A, the wavelength dispersion value of the variable dispersion compensator may be set at a given position (for example, (b) of FIG. 11A) where the bit error rate is lower than a prescribed BER value rather than at the center of the parabola showing the dispersion characteristics. In cases where control is provided in such a way that the wavelength dispersion value is held, for example, at the position (a) or (b) of FIG. 11A and the wavelength dispersion value is reset after the bit error rate of the optical signal has exceeded the threshold value for a reset operation, the following problems arise. The parabola showing the dispersion characteristics for the transmitted optical signal is varied rapidly from A to B in the figure due to outside air variations. This creates a danger that a sudden communication failure will take place. Especially, in an optical network system that transmits light at a communication speed of 40 Gbps, the dispersion tolerance is often tight. A communication failure is highly likely to be induced unless the wavelength dispersion value is set at an optimum value.

Where the lowest point of the bit error rate is not found as mentioned previously, when the wavelength dispersion value is set at the midpoint of the wavelength dispersion values of the variable dispersion compensator at two points at which the parabola indicating the dispersion characteristics for the optical signal intersects with a level line of the preset threshold value for bit error rates, the following problems take place.

Figure 11B:
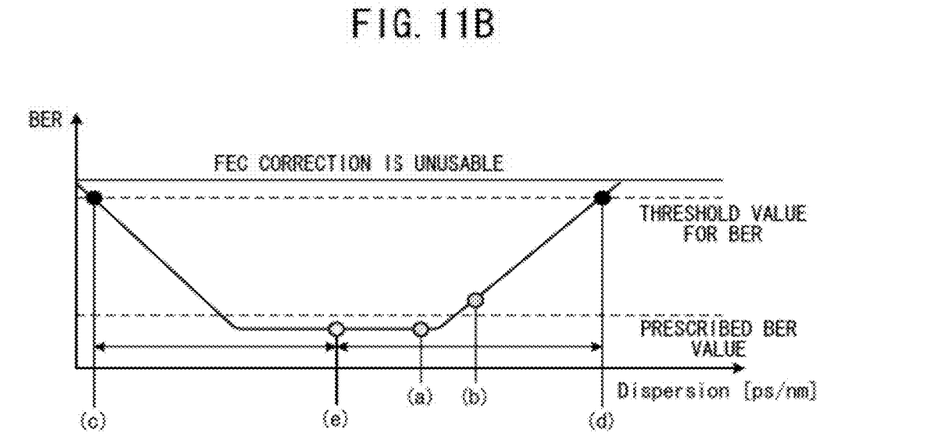
FIG. 11B is a graph illustrating a second kind of dispersion characteristics for optical signals.

As illustrated in FIG. 11B, where the parabola showing the dispersion characteristics for the optical signal is relatively mild, it is necessary to make an adjustment over a wide range for the setting of the threshold value for bit error rates to permit identification of the two points (e.g., (c) and (d) of FIG. 11B) at which parabolas showing the dispersion characteristics for the optical signal and the preset threshold value for bit error rates intersect. Consequently, it takes a long time to set the ultimate wavelength dispersion value.

Accordingly, the present invention has been made to address the problems with the prior art. It is an object of the invention to provide an optical transmission apparatus, an optical transmission method, and an optical transceiver which allow the setting of an optimum wavelength dispersion value without producing communication failures and which may shorten the time taken to set the wavelength dispersion value.

In order to address the foregoing problems, the disclosed apparatus monitors the bit error rate (BER) of an optical signal for each of set values for a dispersion compensator that have been set less closely to each other within a dispersion compensation control range than when a wavelength dispersion value set into the dispersion compensator is determined. The apparatus has a rough adjustment execution portion for carrying out a rough adjustment to determine a comparison threshold value used to set the wavelength dispersion value of the dispersion compensator based on the monitored bit error rate. The apparatus further monitors the bit error rate for each of the set values for the dispersion compensator that have been set more closely to each other than the set values for the rough adjustment execution portion, using the minimum value of the bit error rates acquired by the rough adjustment execution portion as a starting point. Then, the monitored bit error rate is compared with the comparison threshold value determined by the rough adjustment execution portion. Two bit error rates which first exceed the comparison threshold value are acquired. The apparatus further includes a fine adjustment execution portion for carrying out a fine adjustment to determine a wavelength dispersion value corresponding to the midpoint between the two acquired bit error rates as the wavelength dispersion value of the dispersion compensator.

The disclosed apparatus makes it possible to set an optimum wavelength dispersion value that induces no communication failures. Furthermore, the apparatus may shorten the time taken to set the wavelength dispersion value.

Embodiments of the optical transmission apparatus, optical transmission method, and optical transceiver are hereinafter described with reference to the accompanying drawings.

In summary, an optical transmission apparatus associated with embodiment 1 provides controllable dispersion compensation on an optical signal transmitted through an optical network system by a dispersion compensator. The apparatus determines a comparison threshold value by a rougher adjustment than when a dispersion value set into the dispersion compensator for the dispersion compensation is determined, the threshold value being used for determination of the dispersion value.

The apparatus determines an optimum value of wavelength dispersion based on the determined comparison threshold value.

Consequently, the time taken to set the wavelength dispersion value may be shortened greatly. Furthermore, the optimum value of wavelength dispersion that induces no communication failures may be set. The wavelength dispersion value lies at the center of the dispersion characteristics for the optical signal.

[Configuration of Optical Transmission Apparatus (Embodiment 1)]

Figure 1:
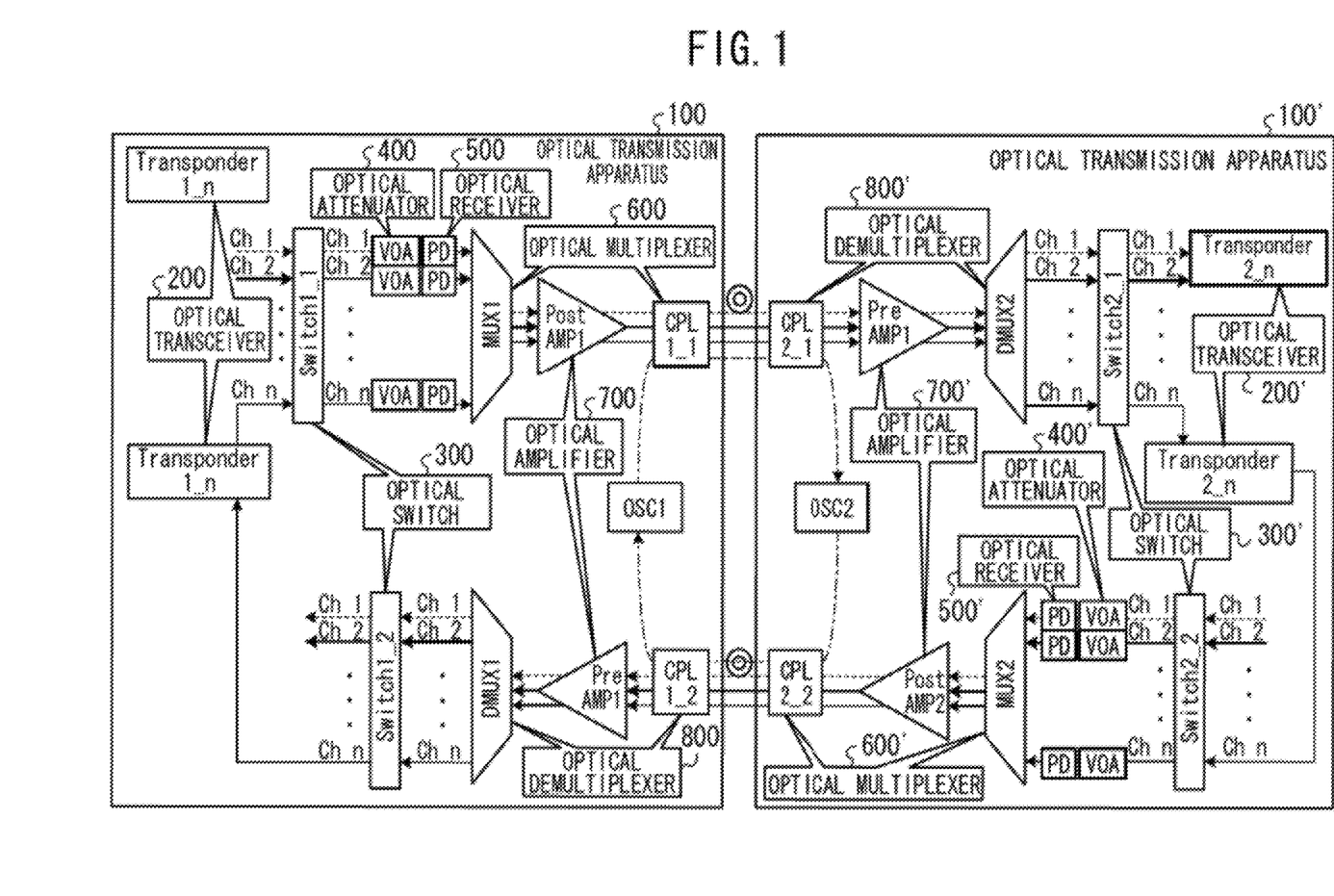
FIG. 1 is a diagram illustrating the configuration of an optical transmission apparatus associated with embodiment 1 of the present invention.

FIG. 1 is a diagram illustrating the configuration of an optical transmission apparatus associated with embodiment 1. The optical transmission apparatus 100 associated with embodiment 1 has an optical transceiver 200, an optical switch 300, an optical attenuator 400, an optical receiver 500, an optical multiplexer 600, an optical amplifier 700, and an optical demultiplexer 800. The optical transmission apparatus 100 cooperates with an optical transmission apparatus 100' to form an optical network system. The apparatus 100' is connected with the transmission apparatus 100 via a communication line and is similar in configuration with the transmission apparatus 100. The second optical transmission apparatus 100' has components which are similar to those of the first optical transmission apparatus 100 and which include an optical transceiver 200' and an optical demultiplexer 800'.

The optical transceiver 200 converts an electrical signal into a light signal. That is, the optical transceiver 200 emits light. The optical transceiver 200 also converts a light signal into an electrical signal. The optical switch 300 switches the optical path for the signal entering from the optical transceiver 200 and outputs the signal to the optical attenuator 400, and switches the optical path for the signal entering from the optical demultiplexer 800 and outputs the signal to the optical transceiver 200. The optical attenuator 400 attenuates the level of the light entering from the optical switch 300. The optical receiver 500 detects the light incident on a light-sensitive surface from the optical attenuator 400 and outputs a voltage proportional to the amount of detected light to the optical multiplexer 600. The optical multiplexer 600 multiplexes different wavelengths of light entering from the optical receiver 500 and outputs the multiplexed wavelengths of light to the optical amplifier 700.

The optical amplifier 700 amplifies the multiplexed signal entered from the optical multiplexer 600 and sends it to another optical transmission apparatus (e.g., optical transmission apparatus 100') without performing mutual conversion between the optical and electrical signals. The optical demultiplexer 800 receives the multiplexed signal from another optical transmission apparatus (e.g., the optical transmission apparatus 100'), separates the multiplexed signal into different wavelengths of signals, and outputs them to the optical switch 300. An OSC (optical supervisory channel) signal is exchanged between the optical receiver 500 and the optical demultiplexer 800.

Figure 2:
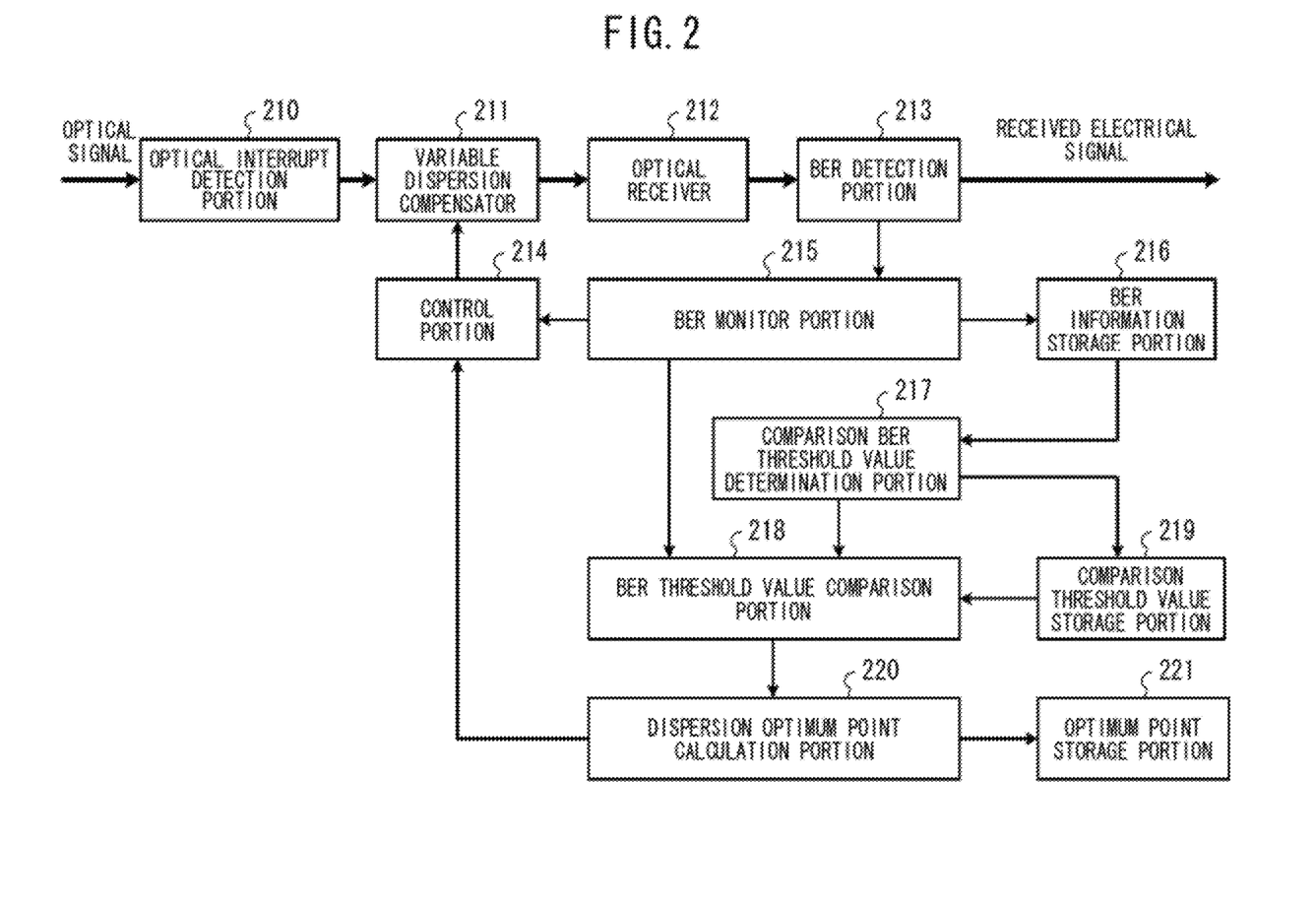
FIG. 2 is a diagram illustrating the configuration of an optical transceiver associated with embodiment 1.

The optical transceiver 200 has an optical interrupt detection portion 210, a variable dispersion compensator 211, an optical receiver 212, a BER detection portion 213, a control portion 214, a BER monitor portion 215, a BER information storage portion 216, and a comparison BER threshold value determination portion 217 as illustrated in FIG. 2. Furthermore, the transceiver 200 has a BER threshold value comparison portion 218, a comparison threshold value storage portion 219, a dispersion optimum point calculation portion 220, and an optimum point storage portion 221. FIG. 2 shows the configuration of the optical transceiver associated with embodiment 1.

The optical interrupt detection portion 210 detects interruption of an optical signal. The variable dispersion compensator 211 provides variable dispersion compensation of incident light under control of the control portion 214. The optical receiver 212 converts the light entered from the variable dispersion compensator 211 into an electrical signal. The BER detection portion 213 analyzes the electrical signal entered from the optical receiver 212 and detects the bit error rate (BER) of the optical signal entered into the optical transceiver 200.

As described later, the control portion 214 determines a comparison threshold value by a rough adjustment using the optimum point storage portion 221, the threshold value being used for determination of the wavelength dispersion value. The wavelength dispersion value is determined by a fine adjustment using the determined comparison threshold value. The dispersion compensation provided by the variable dispersion compensator 211 is controlled by setting the determined wavelength dispersion value into the variable dispersion compensator 211.

[Operation for Rough Adjustment]

First, the operation performed until the comparison threshold value is determined by the optical transceiver 200 using a rough adjustment is described. When the power supply of the optical transmission apparatus 100 is turned on, the control portion 214 varies the set value for the variable dispersion compensator 211 in large increments in a given direction from an arbitrary starting point (e.g., an origin) of setting within a tolerable set range for control of dispersion compensation. For example, the control portion may vary the value in increments of 50 ps/nm within a set range of ±1,000 ps/nm.

Figure 3A:
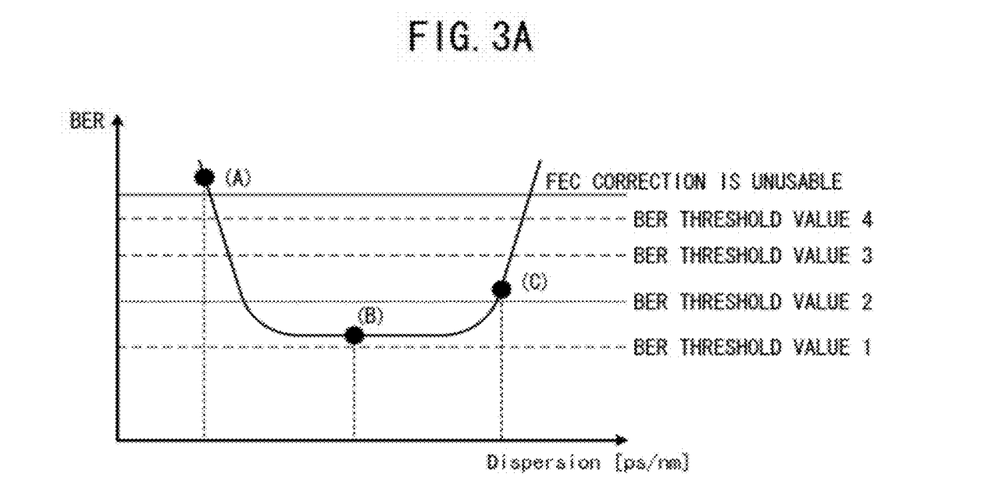
FIG. 3A is a graph illustrating rough adjustment of the optical transmission apparatus associated with embodiment 1.

The BER monitor portion 215 monitors the bit error rate (BER) (for example, (A), (B), and (C) of FIG. 3A) detected by the BER detection portion 213 for each set value for the variable dispersion compensator 211 and stores BER information about each monitored BER into the BER information storage portion 216. FIG. 3A is a graph illustrating a rough adjustment performed by the optical transmission apparatus associated with embodiment 1.

The comparison BER threshold value determination portion 217 reads BER information about each set value for the variable dispersion compensator 211 from the BER information storage portion 216 and acquires the best value (for example, (B) of FIG. 3A) which is the minimum bit error rate.

The comparison BER threshold value determination portion 217 detects under which one of the preset comparison threshold values (e.g., BER threshold values 1 to 4 of FIG. 3A) the best value (i.e., the minimum bit error rate) is located. For example, in the case illustrated in FIG. 3A, the best value (B) giving the minimum bit error rate can be judged to be located under the BER threshold value 2. Therefore, the BER threshold value 2 is determined as a comparison threshold value and stored in the comparison threshold value storage portion 219.

In the description provided above, a plurality of comparison threshold values (e.g., BER threshold values 1 to 4 of FIG. 3A) are previously set for comparison with the best value representing the minimum bit error rate, and a comparison threshold value used for determination of the wavelength dispersion value is determined. It is to be noted, however, that the invention is not limited to this method. For example, the comparison threshold value may be determined by reading BER information from the BER information storage portion 216, selecting the best value (i.e., the minimum bit error rate) from the BER information read out, and multiplying the best value by an integer (e.g., 10).

The set values for the variable dispersion compensator 211 are set within the dispersion tolerance of the optical receiver 212.

One conceivable method of setting each set value for the variable dispersion compensator 211 consists of varying the set value from a negative value to a positive value or vice versa. Another method consists of varying the set value from the origin toward one of the left and right sides and then varying the set value toward the other side.

In a case where any effective point (such as (B) of FIG. 3A) is not found in determining the comparison threshold value after the various set values for the variable dispersion compensator 211 have been varied over a whole range, the various set values for the variable dispersion compensator 211 are again varied after varying the starting point of setting within a tolerable set range of the dispersion compensation control. For example, where the set value is varied to −1,000, −950, −900, . . . ps/nm in a first setting operation, the value is varied to −975, −925, −875, . . . ps/nm in a next setting operation to prevent the set value from becoming equal to the first sequence of values.

[Operation for Fine Adjustment]

An operation performed by the optical transceiver 200 until the wavelength dispersion value is determined using a fine adjustment is next described. The control portion 214 varies the set value for the variable dispersion compensator 211 in smaller increments than when the comparison threshold value is determined as described previously, using the best value of bit error rates (giving the minimum value) stored in the BER information storage portion 216 as a starting point. For instance, the value is varied in increments of 5 ps/nm using the best value (for example, (B) of FIG. 3A) giving the minimum bit error rate as a starting point.

Figure 3B:
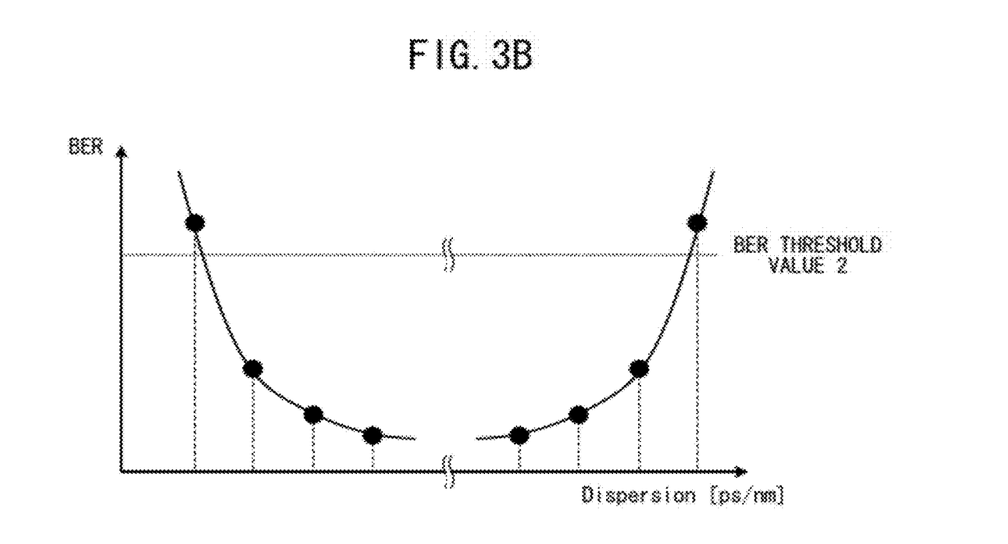
FIG. 3B is a graph illustrating fine adjustment of the optical transmission apparatus associated with embodiment 1.

The BER monitor portion 215 monitors the BER (see, for example, FIG. 3B) detected by the BER detection portion 213 for each set value for the variable dispersion compensator 211 and stores BER information about each monitored BER into the BER information storage portion 216.

The BER threshold value comparison portion 218 reads the comparison threshold value from the comparison threshold value storage portion 219, reads each set of BER information (in which the best value giving the minimum bit error rate is used as a starting point) from the BER information storage portion 216, and compares each set of BER information with the comparison threshold value.

The BER threshold value comparison portion 218 acquires two set values corresponding to their respective sets of BER information exceeding the comparison threshold value from the various set values for the variable dispersion compensator 211. The two set values indicate two locations at which a parabola showing dispersion characteristics intersects with a level line of the comparison threshold value. For example, in FIG. 4A, set values corresponding to points (D) and (E) are acquired as the set values corresponding to their respective sets of BER information exceeding the comparison threshold value (BER threshold value 2) from the set values for the variable dispersion compensator 211.

The dispersion optimum point calculation portion 220 calculates a value centered at the sequence of set values acquired by the BER threshold value comparison portion 218, determines the calculated value as an optimum wavelength dispersion value, and stores it into the optimum point storage portion 221. The control portion 214 reads the optimum wavelength dispersion value from the optimum point storage portion 221 and sets the optimum wavelength dispersion value into the variable dispersion compensator 211.

Where the dispersion characteristics for the optical signal vary during execution of the above-described fine adjustment, it is possible to cope with the variations as described below. For example, each set value corresponding to each set of BER information exceeding the comparison threshold value is acquired a plurality of times, and a determination is made. Each set value corresponds to the position of the parabola indicating the dispersion characteristics at which the parabola intersects with a level line of the comparison threshold value. Efficient processing can be achieved by taking notice of only values close to the points at which the parabola crosses the level line of the comparison threshold value.

Figure 4A:
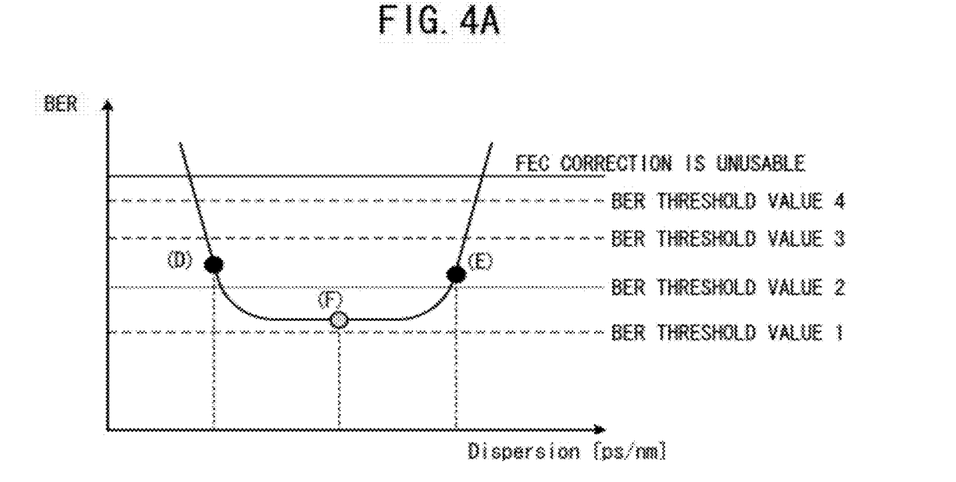
FIG. 4A is a graph illustrating fine adjustment of the optical transmission apparatus associated with embodiment 1.
Figure 4B:
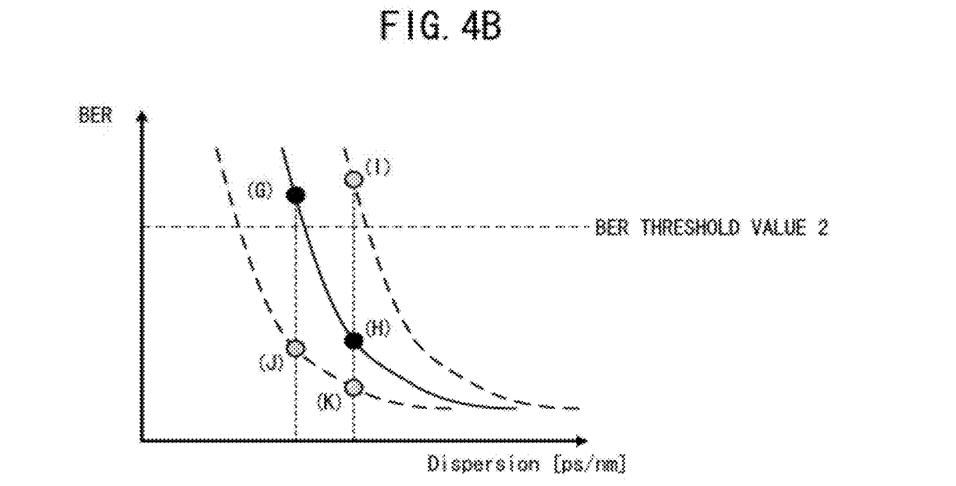
FIG. 4B is a graph illustrating fine adjustment of the optical transmission apparatus associated with embodiment 1.

For example, when the BER information ((G) and (H) of FIG. 4B) monitored the first time by the BER monitor portion 215 is different from the BER information ((I), (J), or (K) of FIG. 4B) monitored the second time, the fine adjustment is made again. Furthermore, if a dispersion characteristic line provided by BER information monitored the second time is different from a dispersion characteristic line provided by BER information monitored the first time in the left portion and right portion of the dispersion characteristic line, the fine adjustment is also made again. If a dispersion characteristic line provided by BER information monitored the second time is different from a dispersion characteristic line provided by BER information monitored the first time in one of the left and right portions of the dispersion characteristic line, the fine adjustment is again made only on the different side. FIGS. 3B to 4B are graphs illustrating the fine adjustments of the optical transmission apparatus associated with embodiment 1.

[Operation for Readjustment]

Figure 5:
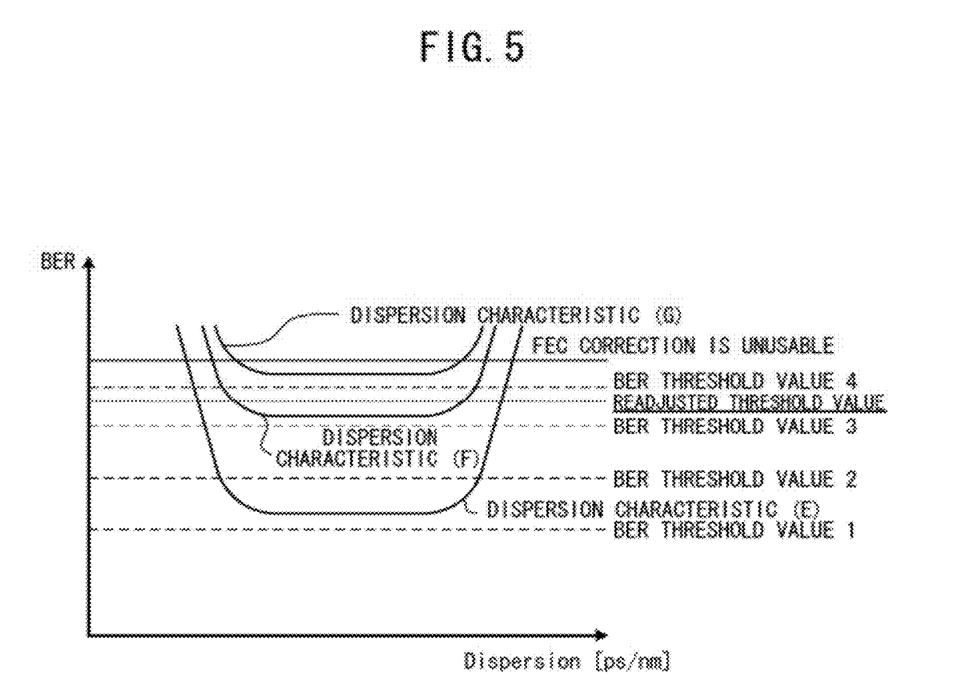
FIG. 5 is a graph illustrating readjustment of the optical transmission apparatus associated with embodiment 1.

An operation for periodic readjustment of the wavelength dispersion value after the start of operation of the optical transmission apparatus 100 is described. For example, as illustrated in FIG. 5, a readjusted threshold value for starting an operation for readjustment of the wavelength dispersion value is set between the greatest BER threshold value (BER threshold value 4) and the next greatest BER threshold value (BER threshold value 3) out of the preset BER threshold values.

The comparison BER threshold value determination portion 217 acquires the dispersion characteristics for the optical signal in operation based on the BER information stored in the BER information storage portion 216, and makes a decision as to whether the bottom value of the acquired dispersion characteristics is below the readjusted threshold value.

If the decision is that the bottom value of the dispersion characteristics is below the readjusted threshold value, the comparison BER threshold value determination portion 217 makes a decision as to whether the bottom value is below the BER threshold value (BER threshold value 3 of FIG. 5) of the next magnitude of the readjusted threshold value.

If the comparison BER threshold value determination portion 217 has determined that the bottom value of the dispersion characteristics is below the BER threshold value of the next magnitude (BER threshold value 3 of FIG. 5) of the readjusted threshold values as indicated by (E) of FIG. 5, the optical transmission apparatus 100 executes the readjustment of the wavelength dispersion value by a method similar to the aforementioned fine adjustment.

On the other hand, if the comparison BER threshold value determination portion 217 has determined that the bottom value of the dispersion characteristics is in excess of the BER threshold value of the next magnitude of the readjusted threshold values (BER threshold value 3 of FIG. 5) as indicated by (F) of FIG. 5, the optical transmission apparatus 100 executes the readjustment of the wavelength dispersion value using a readjusted threshold value as the comparison threshold value by a method similar to the aforementioned fine adjustment. FIG. 5 is a graph illustrating the readjustment of the optical transmission apparatus associated with embodiment 1.

If the comparison BER threshold value determination portion 217 has determined that the bottom value of the dispersion characteristics for the optical signal in operation is not below the readjusted threshold value, the optical transmission apparatus 100 performs no readjustment. Similarly, if the bottom value of the dispersion characteristics for the optical signal in operation is already in excess of the readjusted threshold value, the optical transmission apparatus 100 performs no readjustment.

[Operation Performed on Occurrence of a Communication Failure]

The operation of the optical transmission apparatus 100 when a communication failure has occurred is described. When interruption of the optical signal is detected, the optical interrupt detection portion 210 remains on standby until a next optical signal is detected. When the optical signal is detected by the optical interrupt detection portion 210, the optical transmission apparatus 100 readjusts the wavelength dispersion value, using the comparison threshold value stored in the comparison threshold value storage portion 219. In this operation, the wavelength dispersion value stored in the optimum point storage portion 221 is taken as a first set value. After setting the readjusted wavelength dispersion value into the variable dispersion compensator 211, the optical transmission apparatus 100 checks whether the communication failure has been eliminated or not, that is whether the optical transmission apparatus has been restored to its normal state or not. When the restoration is checked, the optical transmission apparatus 100 again carries out the aforementioned fine adjustment and terminates the processing.

On the other hand, when restoration from the communication failure has not been checked, the optical transmission apparatus 100 carries out the aforementioned rough adjustment and the fine adjustment. After setting the wavelength dispersion value obtained by the fine adjustment into the variable dispersion compensator 211, the optical transmission apparatus 100 checks whether the failure has been removed or not. If restoration from the failure has been checked, the optical transmission apparatus 100 terminates the processing.

[Processing By Optical Transmission Apparatus (Embodiment 1)]

Figure 6:
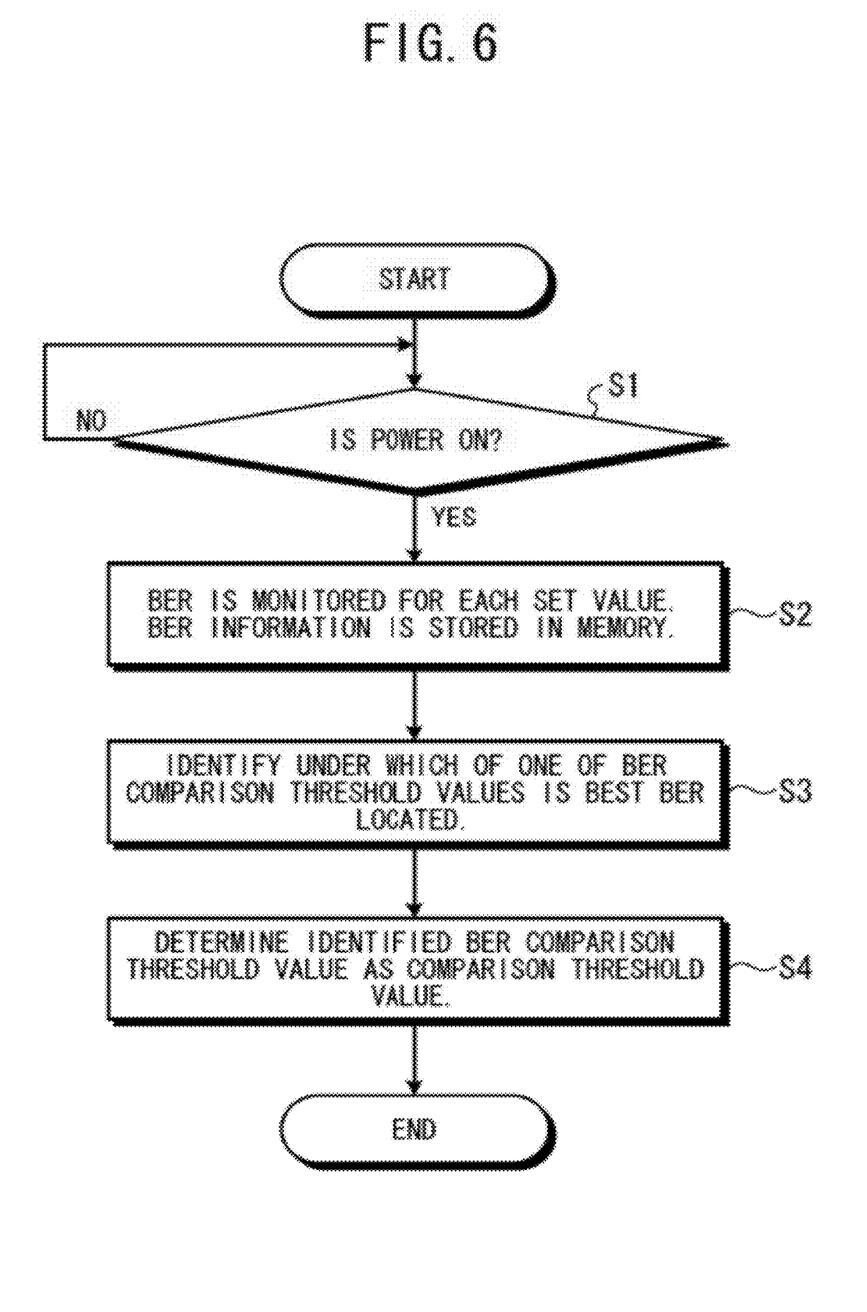
FIG. 6 is a flowchart illustrating processing (a subroutine) for making a rough adjustment by the optical transmission apparatus associated with embodiment 1.

FIG. 6 is a flowchart illustrating the processing for rough adjustment performed by the optical transmission apparatus associated with embodiment 1. As illustrated in the figure, when the power supply of the optical transmission apparatus 100 is turned on (decision at step S1 is affirmative (Yes)), the control portion 214 varies the set value for the variable dispersion compensator 211 in large increments in a given direction from an arbitrary starting point for setting (e.g., the origin) within a tolerance range of the setting for dispersion compensation control.

The BER monitor portion 215 monitors the BER (e.g., (A), (B), and (C) of FIG. 3A) detected by the BER detection portion 213 for each set value for the variable dispersion compensator 211 and stores the BER information about each monitored BER into the BER information storage portion 216 (step S2).

The comparison BER threshold value determination portion 217 reads the BER information about each set value for the variable dispersion compensator 211 from the BER information storage portion 216, acquires the best value (BER) giving the minimum bit error rate, and identifies under which one of the preset comparison threshold values (e.g., BER threshold values 1 to 4 of FIG. 3A) the acquired best value (BER) is located (step S3). The determination portion 217 determines the identified BER threshold value (e.g., BER threshold value 2 of FIG. 3A) as the comparison threshold value (step S4), stores the value into the comparison threshold storage portion 219, and terminates the processing.

Figure 7:
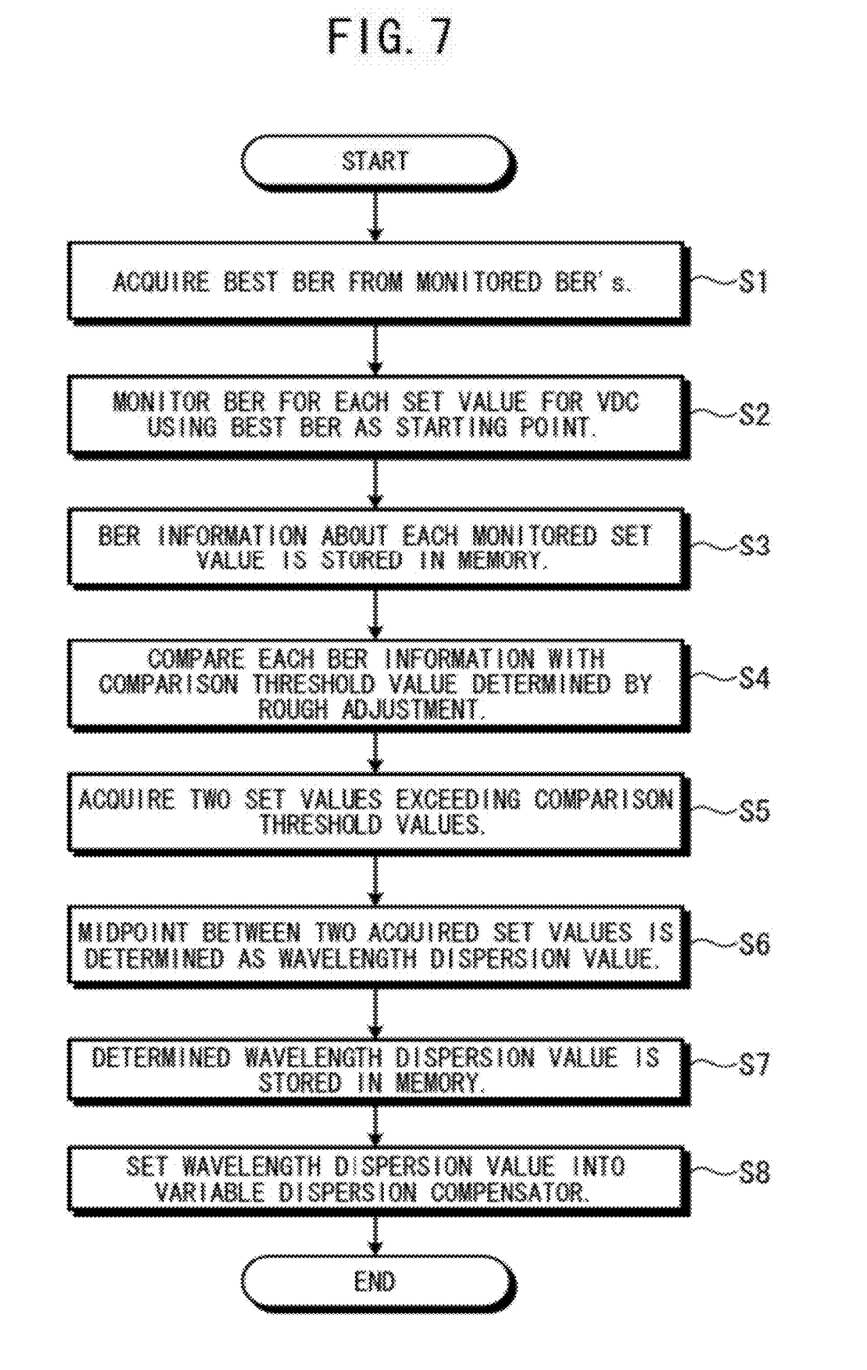
FIG. 7 is a flowchart illustrating processing (another subroutine) for making a fine adjustment by the optical transmission apparatus associated with embodiment 1.

FIG. 7 is a flowchart illustrating the processing for fine adjustment performed by the optical transmission apparatus associated with embodiment 1. As illustrated in the figure, the control portion 214 obtains the best value (BER) giving the minimum bit error rate from the bit error rates stored in the BER information storage portion 216 (step S1).

The control portion 214 varies the set value for the variable dispersion compensator 211 in smaller increments than when the comparison threshold value is determined, using the acquired best value (BER) giving the minimum bit error rate as a starting point. The BER monitor portion 215 monitors the BER (see, for example, FIG. 4B) detected by the BER detection portion 213 for each set value for the variable dispersion compensator 211 (step S2) and stores the BER information about each monitored BER into the BER information storage portion 216 (step S3).

The BER threshold value comparison portion 218 reads the comparison threshold value (for example, BER threshold value 2 of FIG. 3A) from the comparison threshold value storage portion 219, reads each set of BER information (in which the best value giving the minimum bit error rate is taken as the starting point) from the BER information storage portion 216, and compares each set of BER information with the comparison threshold value (step S4).

The BER threshold value comparison portion 218 obtains two set values respectively corresponding to two sets of BER information exceeding the comparison threshold value from each set value for the variable dispersion compensator 211 (step S5). The two set values correspond to positions at which a parabola indicating the dispersion characteristics crosses a level line of the comparison threshold value. For example, in the case of FIG. 4A, set values respectively corresponding to points (D) and (E) are obtained as set values corresponding to each set of BER information indicating a value exceeding the comparison threshold value (BER threshold value 2) from the set values for the variable dispersion compensator 211.

The dispersion optimum point calculation portion 220 calculates a value centered at the sequence of set values obtained by the BER threshold value comparison portion 218, determines the calculated value as an optimum wavelength dispersion value (step S6), and stores the optimum wavelength dispersion value in the optimum point storage portion 221 (step S7). The control portion 214 reads the optimum wavelength dispersion value from the optimum point storage portion 221, sets the value to the variable dispersion compensator 211 (step S8), and terminates the processing.

Figure 8:
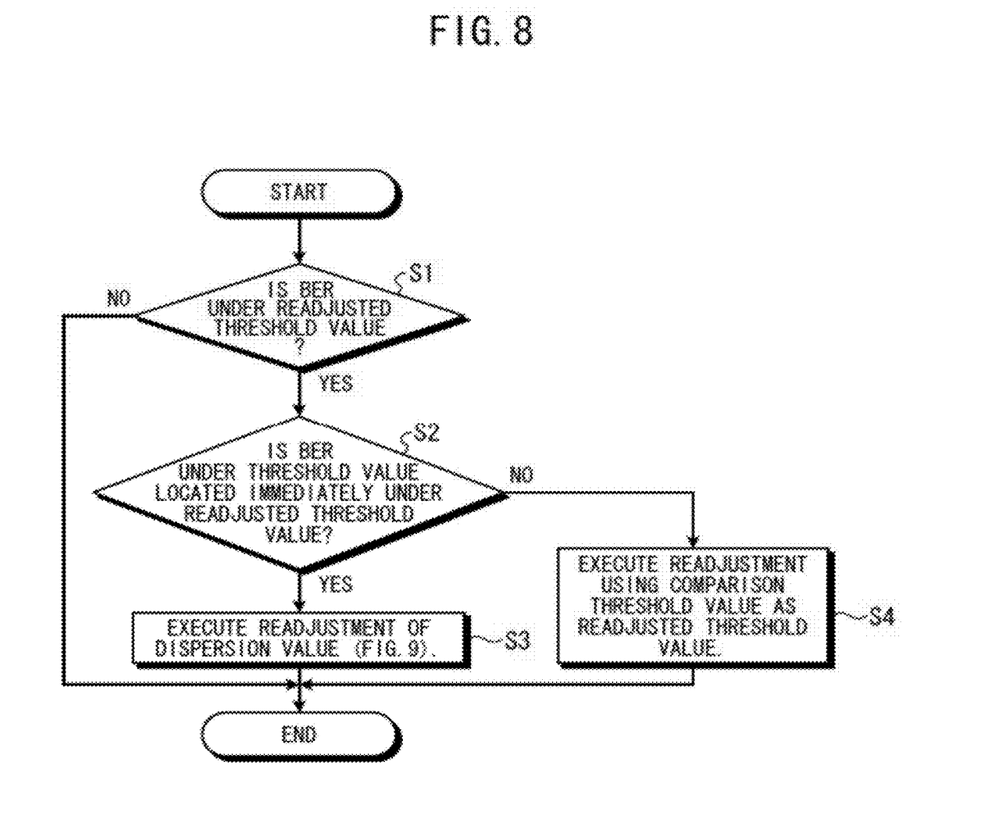
FIG. 8 is a flowchart illustrating processing (another subroutine) for making a readjustment using the optical transmission apparatus associated with embodiment 1.

FIG. 8 is a flowchart illustrating processing for readjustment performed by the optical transmission apparatus associated with embodiment 1. As illustrated in the figure, the comparison BER threshold value determination portion 217 obtains the dispersion characteristics for the optical signal in operation based on the BER information stored in the BER information storage portion 216, and makes a decision as to whether the bottom value of the dispersion characteristics is below the readjusted threshold value (step S1). If the decision at step S1 is affirmative, i.e., the bottom value of obtained dispersion characteristics is below the readjusted threshold value, the comparison BER threshold value determination portion 217 makes a decision as to whether the bottom value is under the BER threshold value of the next magnitude (BER threshold value 3 of FIG. 5) of the readjusted threshold value (step S2).

If the comparison BER threshold value determination portion 217 has determined that the bottom value of the dispersion characteristics is under the BER threshold value (BER threshold value 3 of FIG. 5) of the next magnitude of the readjusted threshold value (for example, (E) of FIG. 5) (the decision at step S2 is affirmative), the optical transmission apparatus 100 carries out the readjustment of the wavelength dispersion value by a method similar to the aforementioned fine adjustment (see FIG. 7) (step S3) and terminates the processing.

On the other hand, if the decision at step S2 is negative (for example (F) of FIG. 5), that is the comparison BER threshold value determination portion 217 has determined that the bottom value of the dispersion characteristics does not fall below the BER threshold value (BER threshold value 3 of FIG. 5) of the next magnitude of the readjusted threshold value, the optical transmission apparatus 100 carries out the readjustment of the wavelength dispersion value by a method similar to the aforementioned fine adjustment (see FIG. 7) using the readjusted threshold value as the comparison value (step S4), and terminates the processing.

If the decision at step S1 is negative, that is the comparison BER threshold value determination portion 217 has determined that the bottom value of the dispersion characteristics does not fall below under the readjusted threshold value, the processing is terminated intact without performing the processing for readjustment.

Figure 9:
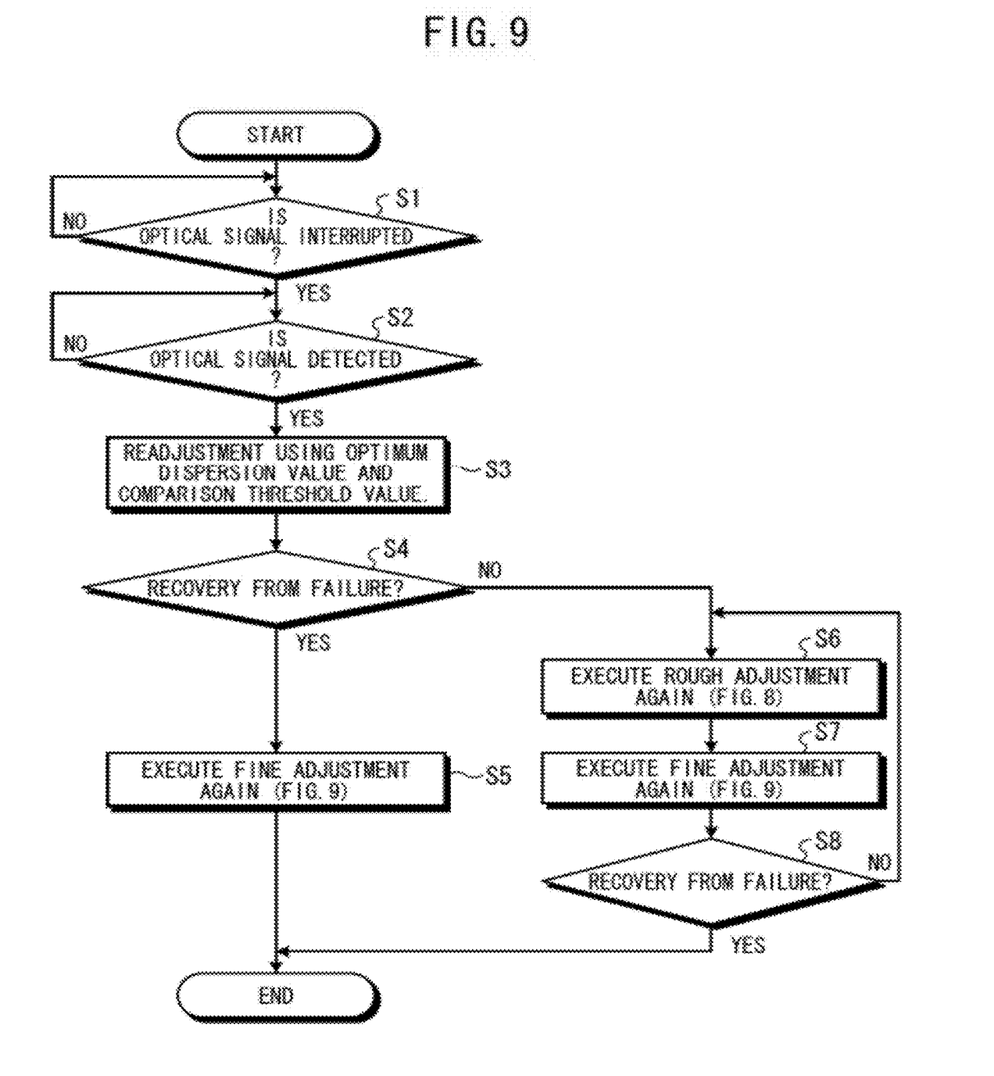
FIG. 9 is a flowchart illustrating processing (another subroutine) to be performed by the optical transmission apparatus associated with embodiment 1 when a communication failure has taken place.

FIG. 9 is a flowchart illustrating processing performed by the optical transmission apparatus associated with embodiment 1 when a communication failure has taken place. As illustrated in the figure, when interruption of the optical signal is detected (decision at step S1 is affirmative), the optical interrupt detection portion 210 remains on standby until a next optical signal is detected (step S2). If the decision at step S2 is affirmative, that is the optical interrupt detection portion 210 has detected light, the optical transmission apparatus 100 carries out the readjustment of the wavelength dispersion value, using the comparison threshold value stored in the comparison threshold value storage portion 219 as the first set value of the wavelength dispersion values stored in the optimum point storage portion 221 (step S3).

After setting the readjusted wavelength dispersion value into the variable dispersion compensator 211, the optical transmission apparatus 100 checks whether the communication failure has been removed (step S4). If the decision at step S4 is affirmative, that is restoration from the communication failure is confirmed, the optical transmission apparatus 100 again carries out the aforementioned fine adjustment (see FIG. 7) (step S5), and terminates the processing.

On the other hand, if the decision at step S4 is negative, that is restoration from the communication failure has not been confirmed, the optical transmission apparatus 100 performs the rough adjustment (see FIG. 6) (step S6). In addition, the apparatus 100 carries out the fine adjustment (see FIG. 7) again (step S7). After setting the wavelength dispersion value obtained by the fine adjustment into the variable dispersion compensator 211, the optical transmission apparatus 100 checks whether the communication failure has been corrected (step S8). If the decision at step S8 is affirmative (restoration from the communication failure has been confirmed), the optical transmission apparatus 100 terminates the processing. On the other hand, if the decision at step S8 is negative (restoration from the communication failure has not been confirmed), the optical transmission apparatus 100 repeatedly carries out the steps S6 and S7 until the restoration is confirmed.

[Advantages of Embodiment 1]

As described so far, according to embodiment 1, the bit error rate (BER) is monitored for each of the set values that are set less closely to each other than when a dispersion value is determined. A comparison threshold value for determining the dispersion value used for control of dispersion is previously determined from the monitored BER of the optical signal. That is, a rough adjustment is made. After the rough adjustment, the dispersion value is determined based on the comparison threshold value determined by the rough adjustment. That is, a fine adjustment is made. Therefore, the time taken to set the wavelength dispersion value can be shortened greatly. Furthermore, an optimum wavelength dispersion value which induces no communication failure and which is centered at the dispersion characteristics for the optical signal may be set.

In addition, according to embodiment 1, the time taken to set the wavelength dispersion value is shortened greatly and so the whole optical transmission apparatus 100 may be activated in a shorter time.

Moreover, according to embodiment 1, the time taken to set the wavelength dispersion value is shortened greatly and so the life of the variable dispersion compensator 211 may be extended.

Embodiment 2 that is another embodiment of the optical transmission apparatus 100 is described.

(1) Configuration of the Apparatus

The components of the optical transceiver 200 within the optical transmission apparatus 100 illustrated in FIG. 2 are only conceptually illustrated in terms of their functions. It is not always necessary that they be physically configured as illustrated. That is, a specific example of distribution or integration of the components of the optical transceiver 200 is not restricted to the illustrated example. For example, the BER threshold value comparison portion 218 and the dispersion optimum point calculation portion 220 may be integrated into a unit. In this way, all or some of the components of the optical transceiver 200 may be distributed or integrated functionally or physically in arbitrary units according to various loads and circumstances of usage. Additionally, all or arbitrary portions of various processing functions (see, for example, FIGS. 6-9) served by the optical transceiver 200 may be realized by a CPU and a program that is analyzed and executed by the CPU. Further, the functions may be implemented as hardware based on wired logic.

(2) Method of Transmitting Light

The optical transceiver 200 of the optical transmission apparatus 100 described in embodiment 1 above realizes the following method of transmitting light.

The bit error rate (BER) of the optical signal is monitored for each of set values for the dispersion compensator which are set less closely to each other within a dispersion compensation control range than when the wavelength dispersion value set into the variable dispersion compensator 211 is determined. The method further includes a process step (see FIG. 6) for carrying out a rough adjustment to determine the comparison threshold value based on the monitored bit error rate. Furthermore, the bit error rate is monitored for each of the set values for the variable dispersion compensator 211 which are set more closely to each other than the set values used during the rough adjustment, using the minimum value of bit error rates acquired by the rough adjustment as a starting point. The monitored bit error rate is compared with the comparison threshold value determined by the process step for the rough adjustment. Two bit error rates which first exceed the comparison threshold value are acquired. An optical transmission method is realized which involves the step of executing a fine adjustment (see FIG. 7) for determining a wavelength dispersion value corresponding to the midpoint between the two acquired bit error rates as the wavelength dispersion value of the variable dispersion compensator 211.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. An optical transmission apparatus, comprising:
a rough adjustment execution portion that monitors a bit error rate of an optical signal for respective set values of a dispersion compensator where the set values have been set less closely to each other within a dispersion compensation control range than when a wavelength dispersion value set in the dispersion compensator is determined, and carries out a rough adjustment to determine a comparison threshold value used to set the wavelength dispersion value of the dispersion compensator based on the monitored bit error rate; and
a fine adjustment execution portion that monitors the bit error rate for the respective set values of the dispersion compensator where the set values have been set more closely to each other than the set values for the rough adjustment execution portion, using the minimum value of the bit error rates acquired by the rough adjustment execution portion as a starting point, compares the monitored bit error rate with the comparison threshold value determined by the rough adjustment execution portion, acquires two bit error rates which first exceed the comparison threshold value, and carries out a fine adjustment to determine a wavelength dispersion value corresponding to the midpoint between the two acquired bit error rates as the wavelength dispersion value of the dispersion compensator.

2. The optical transmission apparatus according to claim 1, wherein the rough adjustment execution portion accepts a plurality of preset candidate threshold values and determines a nearest one of the candidate threshold values as the comparison threshold value, the nearest candidate threshold value being set to a value larger than a minimum value of bit error rates monitored for each of the set values.

3. The optical transmission apparatus according to claim 1, wherein the rough adjustment execution portion determines the comparison threshold value by multiplying a minimum value of bit error rates monitored for each of the set values by a given integer.

4. The optical transmission apparatus according to claim 1, further comprising: a threshold value decision portion which, when a minimum value of bit error rates of the optical signal in operation is below a readjusted threshold value set between a plurality of BER (bit error rate) threshold values, makes a decision as to whether or not the minimum value is below a nearest bit error rate threshold value set to be lower than the readjusted threshold value,
- wherein, when the threshold value decision portion has determined that the minimum value of bit error rates of the optical signal in operation is below the nearest BER threshold value that is set to be lower than the readjusted threshold value, the fine adjustment execution portion executes readjustment using the fine adjustment, and
- wherein, when the threshold value decision portion has determined that the minimum value of bit error rates of the optical signal in operation is in excess of the nearest BER threshold value that is set to be lower than the readjusted threshold value, the fine adjustment execution portion executes readjustment that employs the fine adjustment while using the readjusted threshold value as the comparison threshold value.

5. The optical transmission apparatus according to in claim 1, further comprising:
- a signal interrupt detection portion for detecting an interruption of an optical signal in operation;
- an optical detection portion for re-detecting the optical signal after the interruption of the signal has been detected by the signal interrupt detection portion; and
- a transmission-reception recovery processing portion which, when the optical signal has been detected by the optical detection portion, performs processing for recovering transmission and reception of the optical signal using the comparison threshold value and the wavelength dispersion value used in the optical transmission apparatus before the interruption of the signal is detected by the signal interrupt detection portion,
- wherein, when the transmission and reception of the optical signal has been recovered by the transmission-reception recovery processing portion, the fine adjustment execution portion again performs the fine adjustment, and
- wherein, when the transmission and reception of the optical signal has not been recovered by the transmission-reception recovery processing portion, the rough adjustment execution portion executes the rough adjustment and determines the comparison threshold value again, and the fine adjustment execution portion again executes the fine adjustment using the comparison threshold value re-determined by the rough adjustment execution portion and determines the wavelength dispersion value.

6. An optical transmission method, comprising:
a rough adjustment execution step of monitoring a bit error rate of an optical signal for respective set values for a dispersion compensator where the set values have been set less closely to each other within a dispersion compensation control range than when a wavelength dispersion value set in the dispersion compensator is determined, and carrying out a rough adjustment to determine a comparison threshold value based on the monitored bit error rate; and
a fine adjustment execution step of monitoring the bit error rate for the respective set values for the dispersion compensator where the set values have been set more closely to each other than the set values for the rough adjustment execution step with the minimum value of the bit error rates acquired by the rough adjustment execution step as a starting point, comparing the monitored bit error rate with the comparison threshold value determined by the rough adjustment execution step, acquiring two bit error rates which first exceed the comparison threshold value, and carrying out a fine adjustment to determine a wavelength dispersion value corresponding to the midpoint between the two acquired bit error rates as the wavelength dispersion value of the dispersion compensator.

7. An optical transceiver, comprising:
a rough adjustment execution portion for monitoring a bit error rate of an optical signal for respective set values for a dispersion compensator where the set values have been set less closely to each other within a dispersion compensation control range than when a wavelength dispersion value set into the dispersion compensator is determined, and carrying out a rough adjustment to determine a comparison threshold value based on the monitored bit error rate; and
a fine adjustment execution portion for monitoring the bit error rate for each of the set values for the dispersion compensator where the set values have been set more closely to each other than the set values for the rough adjustment execution portion with the minimum value of the bit error rates acquired by the rough adjustment execution portion as a starting point, comparing the monitored bit error rate with the comparison threshold value determined by the rough adjustment execution portion, acquiring two bit error rates which first exceed the comparison threshold value, and carrying out a fine adjustment to determine a wavelength dispersion value corresponding to the midpoint between the two acquired bit error rates as the wavelength dispersion value of the dispersion compensator.

* * * * *